Figure 1:
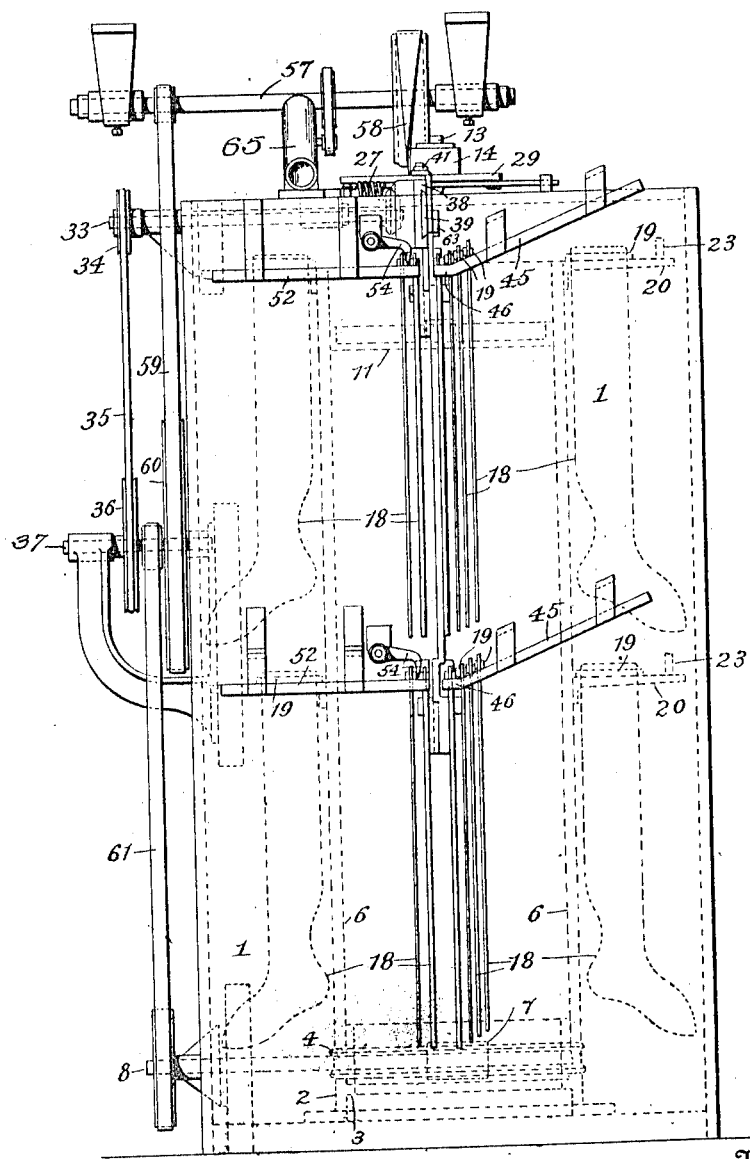

B. A. PARKES.
AUTOMATIC STOCKING DRIER.
APPLICATION FILED APR. 30, 1909.

1,063,829.

Patented June 3, 1913.
5 SHEETS—SHEET 1.

Witnesses:
Jas. E. Hutchinson
J. H. Reid.

Inventor:
Bertrand A. Parkes,
By
Attorney.

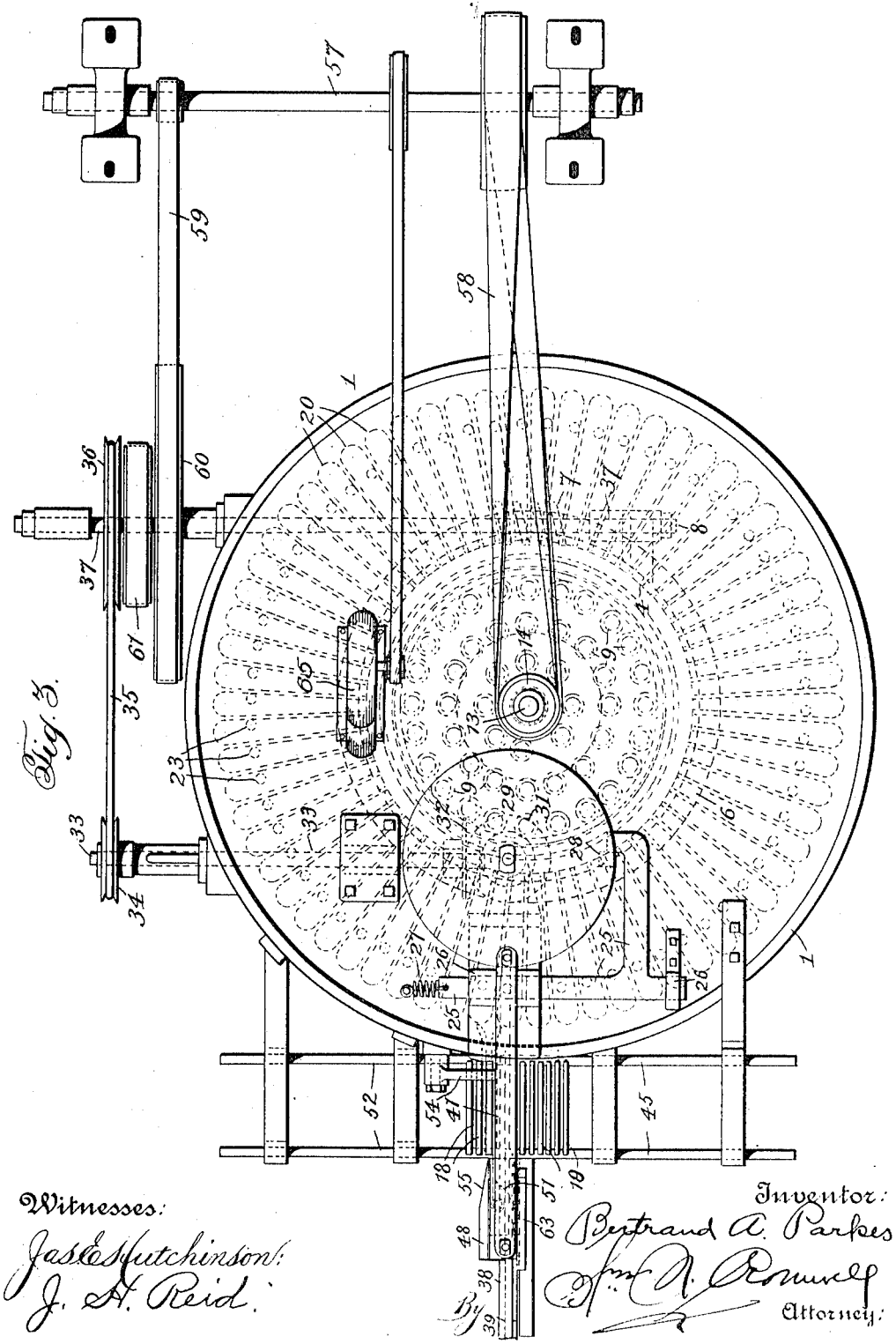

B. A. PARKES.
AUTOMATIC STOOKING DRIER.
APPLICATION FILED APR. 30, 1909.
1,063,829.
Patented June 3, 1913.
5 SHEETS—SHEET 4.
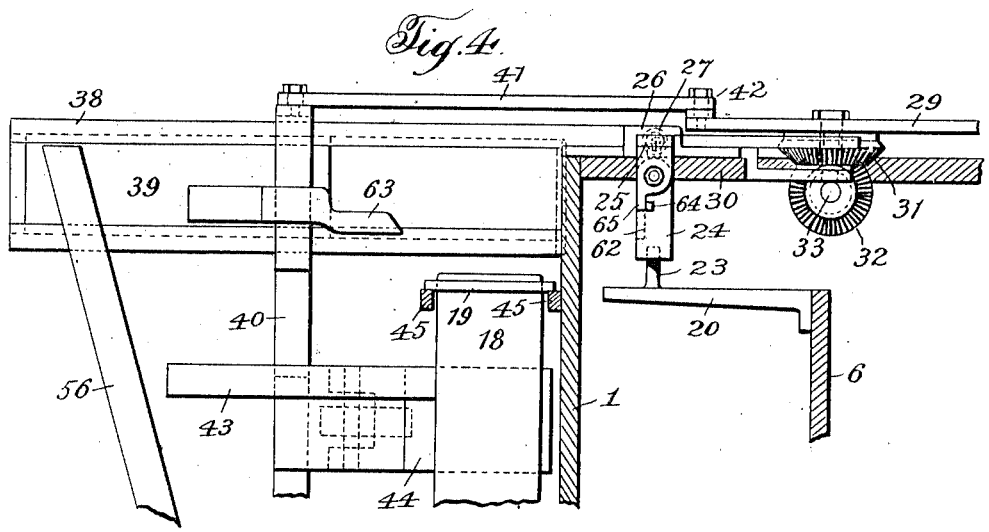
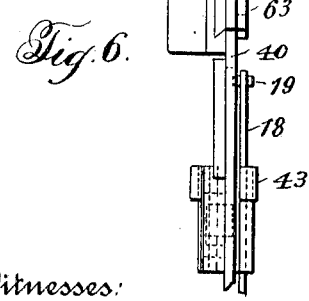
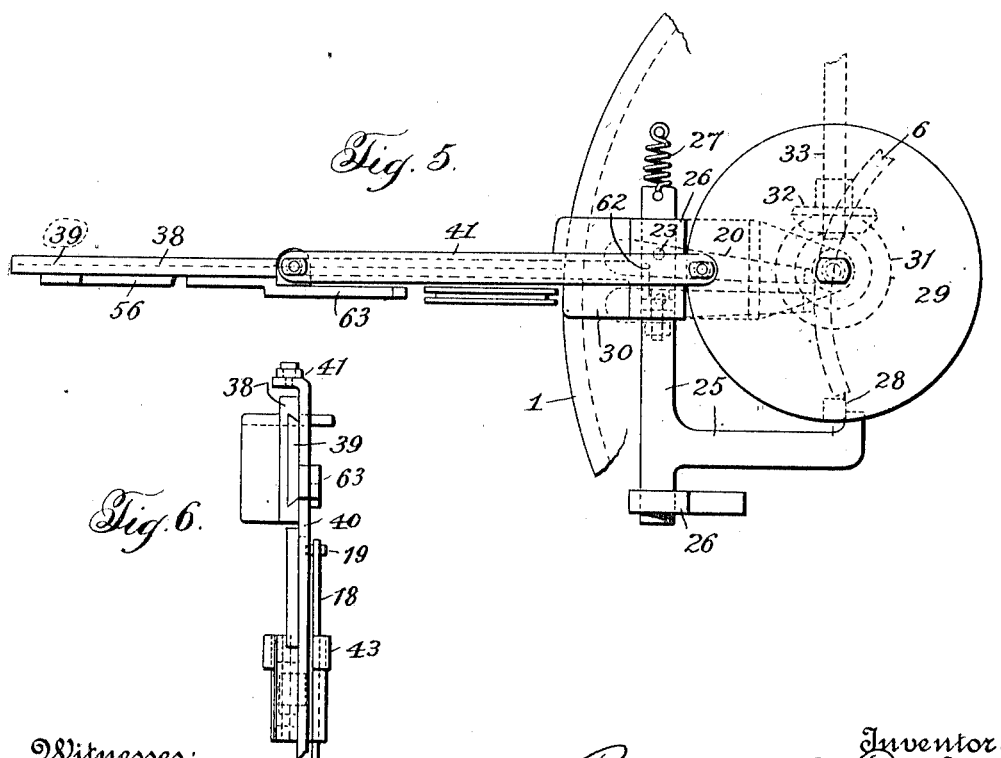

B. A. PARKES.
AUTOMATIC STOCKING DRIER.
APPLICATION FILED APR. 30, 1909.
1,063,829.
Patented June 3, 1913.
5 SHEETS—SHEET 5.
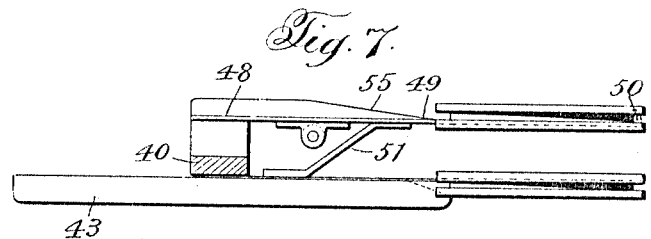
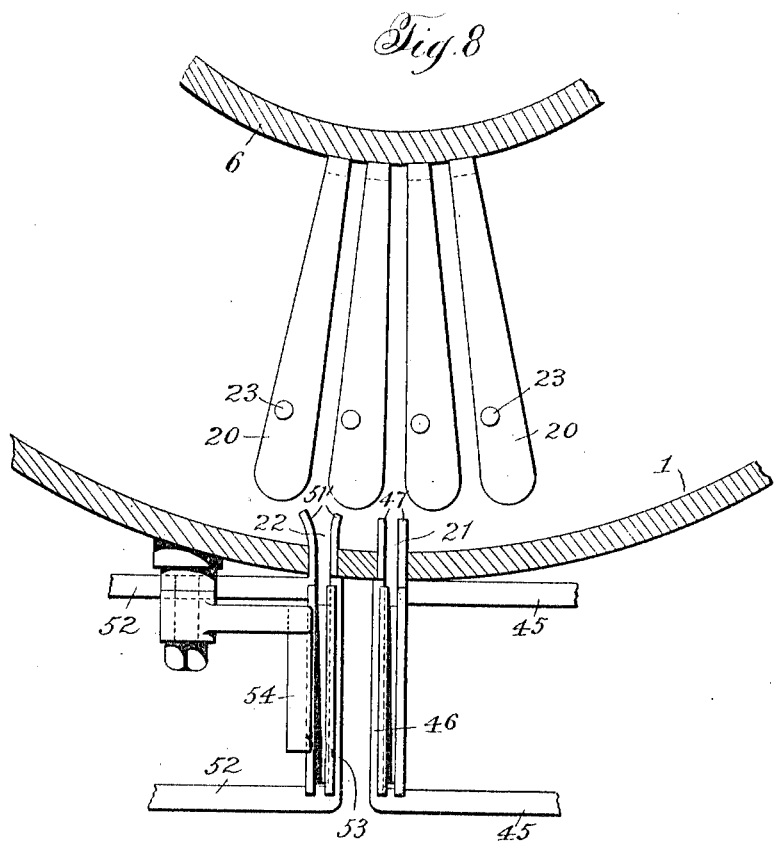
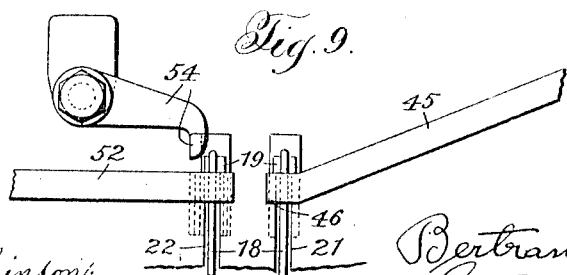
Witnesses:
Jas. E. Hutchinson
J. H. Reid
Inventor:
Bertrand A. Parkes
By _____
Attorney

UNITED STATES PATENT OFFICE.

BERTRAND A. PARKES, OF PHILADELPHIA, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

AUTOMATIC STOCKING-DRIER.

1,063,829.  Specification of Letters Patent.  Patented June 3, 1913.

Application filed April 30, 1909.  Serial No. 493,115.

*To all whom it may concern:*

Be it known that I, BERTRAND A. PARKES, citizen of the United States, residing at Philadelphia, in the county of Philadelphia and State of Pennsylvania, have invented certain new and useful Improvements in Automatic Stocking-Driers; and I do hereby declare the following to be a full, clear, and exact description of the invention, such as will enable others skilled in the art to which it appertains to make and use the same.

This invention relates to improvements in drying machines, and more particularly is related to machines for drying stockings and the like.

The present invention aims to provide a machine of the class referred to designed for continuous operation, and which is so constructed as to greatly increase the speed and capacity of machines previously employed for this purpose, and at the same time produce a machine that is more compact in the association of its parts, thus rendering the machine adaptable to less floor space, and obtaining therewith increased efficiency in the drying of the stockings.

Furthermore, the invention has in view the provision of a stocking drier wherein the introduction of the stockings to the machine and their removal therefrom shall be automatically performed, and in regular succession, the stockings during their movement from the feeding to the delivery mechanism being subjected to the action of the drying agent that, preferably, is maintained in a state of circulation in relation to the path of movement of the stockings, whereby to freely act upon the stockings, so that when the latter reach the delivery mechanism they will be deprived entirely of the moisture with which they were charged at the time of introduction to the machine.

A further object of the invention is to provide a machine of the character referred to wherein the stockings, during their transit through the machine, shall be suspended without contact with parts of the machine, thereby precluding the marking of the stockings that now occurs in the use of the machines commonly employed, by reason of contact of the moist stockings with the supporting elements of the machines.

Having these general objects in view, and others that will appear as the nature of the improvements is better understood, the invention consists, substantially, in the novel construction, combination and arrangement of parts hereinafter fully described, illustrated in the accompanying drawings, and pointed out in the appended claims.

While the form of the invention that is illustrated and described herein is believed, at this time, to be a preferred embodiment thereof, it is obvious that the same is susceptible of change and variation, and the right is accordingly reserved to modify, change or vary the machine as falls within the spirit and scope thereof.

Figure 2:
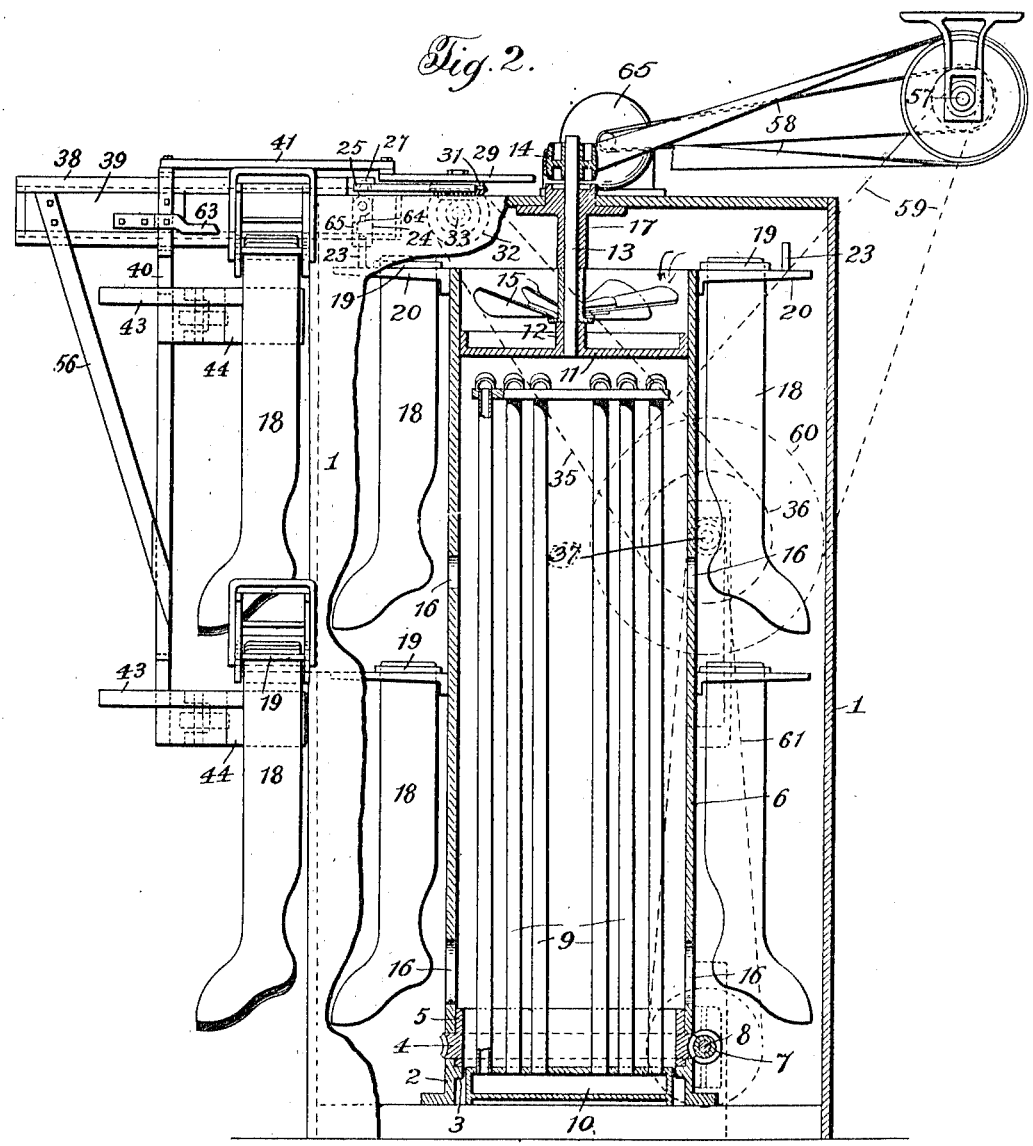

In the drawings:—Figure 1 is a side elevation of an automatic stocking drier constructed in accordance with and embodying the principles of the present invention. Fig. 2 is a similar view taken at right angles to the position of the machine as illustrated in Fig. 1, and also partly in section. Fig. 3 is a top plan view of the machine. Fig. 4 is a detail elevation, on an enlarged scale, of the feed mechanism and the operating means therefor. Fig. 5 is a top plan view thereof. Fig. 6 is an end view of the mechanism illustrated in Figs. 4 and 5, and illustrating also the delivery mechanism that is associated for operation with the feed mechanism. Fig. 7 is a detail plan view of the delivery mechanism. Fig. 8 is a plan view of the feed and delivery guides, illustrating their relation to the machine casing and the supporting devices for the stockings. Fig. 9 is a detail elevation of the guides illustrated in Fig. 8.

Referring now in detail to the drawings, the numeral 1 designates the casing of the herein-described machine, which casing is formed of suitable material, and the same is cylindrical, said casing being supported upon any suitable base.

Within the casing 1 is an annular supporting-base 2 having an inwardly-extending flange 3, and mounted upon said flange 3 for rotation upon the base 2 is a worm wheel 4 having an upwardly-extending collar 5 at its upper face upon which is fitted a cylindrical drum 6. This drum constitutes the carrier for the stockings or other articles to be dried during the drying operation, and the same extends substantially through the length of the casing 1. The worm wheel 4 meshes with a worm 7 that is carried by a shaft 8 that projects through the casing 1, and is driven in the manner hereinafter described.

Within the drum 6 is arranged a series of heating coils 9, through which steam or other heating medium is designed to be circulated to raise the temperature of the air, these coils being connected to a header 10, and mounted at the upper end of the casing 6 is a spider 11 having a hub 12 at its central portion into which extends a vertical shaft 13 that projects at the upper end of the casing 1 and is provided with a pulley 14 for driving purposes. The shaft 13 is loosely fitted in the hub 12, and immediately above the latter said shaft is provided with a fan 15 whereby the air is caused to circulate within the casing 1 and drum 6. The upper end of the drum 6, is, of course, open, so that the air will readily enter the same from the upper end of the casing 1, and be driven by the fan 15 in a downward direction and over the coils 9, the air passing from the drum 6 through a plurality of openings 16 arranged at suitable points in the drum 6.

The shaft 13 is sustained by a suitable journal box 17.

In order to support the stockings within the casing 1 during the drying operation the same are mounted upon forms 18, and through the medium of these forms the stockings are distended in order to permit the circulated air to freely act thereon and dry the same. That the forms 18 may be properly supported the end thereof opposite to the foot portion is provided with oppositely-arranged cleats 19, and these cleats are designed to rest upon a plurality of radially extending supporting fingers 20 that are arranged about the peripheral face of the drum 6. These fingers are spaced apart sufficiently to accommodate the thickness of the forms 18, but not sufficiently to permit the cleats 19 passing therebetween, and, consequently, these cleats serve to hold the forms with the stockings thereon in suspended position. The cleats 19 also serve to prevent the forms 18 warping.

As illustrated in the accompanying drawings, the fingers 20 are arranged in two superimposed series. It is obvious, however, that the number of these fingers, and the number of the series thereof will be determined by the capacity that it is desired to impart to the machine, so that the latter may have one, two or more of these series as may be desired.

Each of the openings 16 is arranged in such position in the drum 6 that the heel portions of the stockings will be suspended opposite to these openings. The purpose of this is to insure drying of the heel portions which, being reinforced, are more difficult to deprive of the moisture than the leg portions of the stockings.

For each of the series of fingers 20 there is provided in the casing 1 an inlet slot 21 and an outlet slot 22, these slots being arranged in parallel relation, and located at the same side of the casing 1, so that the boarded stockings may be introduced to and removed from the casing 1 by feeding and delivery mechanisms that are operated by actuating means common to both. Furthermore, where it is desired to have the machine of large capacity a plurality of the feeding and delivery mechanisms may be arranged at different points about the peripheral face of the casing, and in this event it is, of course, obvious that a plurality of slots 21 and 22 will be provided in accordance with the number of feed and delivery mechanisms that are employed.

In the present machine the rotation of the drum 6 is relied upon for timing the actuation of the feeding and delivery mechanisms, and to the accomplishment of this end each of the fingers 20 is provided with a contact lug 23 that projects upwardly therefrom. These lugs successively contact with a depending abutment 24 that is pivotally mounted to the under side of a locking pawl 25 that is slidably mounted in guides 26 arranged at the outer side of the top of the casing 1. The abutment 24 is designed to swing in the direction of the length of the fingers 20, when the latter are below or immediately beneath said abutment, and when in normal position the abutment 24 is in the path of movement of the contact lugs 23, so that in the rotation of the drum 6 said lugs strike said abutment. As the drum 6 rotates with a continuous movement the abutment 24 moves with the lug 23 that is immediately in engagement therewith and until it is disengaged from the lug, and during such movement the locking pawl 25 is caused to slide in the guides 26 against the stress of a retractile spring 27. During this movement said pawl is disengaged from a depending stud 28 carried by a crank disk 29 that is mounted for rotation in a supporting arm 30, thus releasing said disk. The latter has at its under face a bevel gear 31 that meshes with a similar gear 32 carried by a shaft 33, said shaft projecting at the exterior of the casing 1 and having a pulley 34 mounted upon its outer end to be operated by a friction belt 35 that passes over a pulley 36 mounted upon a shaft 37, which latter is also arranged at the exterior of the casing 1. During the locked position of the disk 29, or during the period that the pawl 25 is engaged with the stud 28, the belt 35 slides around the pulley 34, and hence the shaft 33 does not rotate, but immediately upon the pawl being released from said stud 28 the crank disk 29 is rotated by said belt 35, and during this rotation of said disk a wet stocking is fed into the machine and a dry one removed therefrom. This is effected by the feeding and delivery mechanisms which will now be described.

The numeral 38 designates an outwardly-extending guide that forms part of the supporting arm 30, and movably mounted in said guide is a slide 39 the edges of which are beveled or dovetailed in order that said slide may be retained within said guide. The slide 39 supports the feeding and delivery mechanisms of each of the series or decks of the supporting fingers 20, and each of these mechanisms, for each of the series, is precisely the same in construction. By referring to Figs. 4, 5, 6 and 7, the construction of the feeding and delivery mechanisms is clearly illustrated, and from these it will be observed that a vertically-extending bar 40 is connected to the slide 39, at the upper end of which bar is pivotally connected one end of a link 41, the other end being connected to the crank disk 29, as at 42. Therefore, upon each rotation of the disk 29 the bar 40 and slide 39 are caused to be moved toward and away from said disk. Mounted upon the bar 40, and immediately below the slide 39 is a pusher 43 with which is associated a stop 44, the latter projecting in the path of the stocking forms, when at the exterior of the casing 1, in order to hold the forms in position to be projected through the inlet slot 21. These forms are mounted upon inclined guide rails 45, arranged at the exterior of the casing 1, and the wet stockings, mounted upon the forms, pass down these guide rails 45 by gravity, so that one is always opposite the slot 21 to be projected therethrough. The cleats 19 form the means by which the forms are suspended upon the guide rails, and at the lower end of the latter the rails are spanned by a transverse bar 46, which provides a stop to limit the downward movement of the forms carrying the wet stockings, and position each of the latter opposite the slot 21. It is observed, however, that the bar 46, at its end immediately contiguous to the casing 1, is spaced from the inner guide rail 45 to permit passage of the boarded stocking into said casing. The bar 46 also constitutes a slide upon which the cleat 19 immediately contiguous thereto may travel as the stocking is passed into the casing, and at each side of the slot 21, at the inner side of the casing 1, is arranged a guide finger 47, whereby to direct the cleats 19 upon the two fingers 20 that lie opposite to said slot. The inward movement of the forms is effected by the pusher 43.

At the side of the bar 40 opposite to that whereon the pusher 43 and stop 44 are arranged are the delivery means. This comprises a supporting arm 48 to which is hingedly connected a delivery arm 49 having an engaging head 50 at its inner end, a spring 51 being arranged between the stop 44 and the delivery arm 49, and exerting its tension to normally force the latter away from the stop 44. The arms 48 and 49 are spaced from the stop 44 a distance corresponding to the distance between the slots 21 and 22 in the casing 1; consequently, the delivery arm 49 is opposite the slot 22, and is free to pass through the latter when the slide 39 is moved inwardly by the movement of the disk 29. When the delivery arm 49 is projected into the casing the same is positioned immediately in the path of the advancing dried stockings, the head 50 passes in rear of the inner edge of the form that is next adjacent to the slot 22, and on the outward movement of the slide 39, the delivery arm withdraws the form with the dried stocking thereon through the slot 22, guide fingers 51' being arranged at the inner side of the slot 22 in order to direct the form with the dried stocking thereon to a pair of delivery guide rails 52. The space at the ends of these rails is spanned by a transverse bar 53, similar to the bar 46, and this bar 53 provides a guide for one of the cleats of the form as the latter emerges from the casing 1. A guide pawl 54 is pivotally mounted upon the casing 1, the end of said pawl coöperating with the bar 53 to direct the outward movement of the form that carries the dried stocking, and on the next inward movement of the supporting arm 48 and the delivery arm 49 said arm moves the form carrying the stocking that has just been withdrawn from the casing away from the bar 53 and along the delivery guide rails 52, this movement being imparted to the form by a beveled face 55 that is formed at the inner end of the supporting bar 48.

The bar 40 is braced in relation to the slide 39 by a stay rod 56, and when the machine employs a plurality of series of the fingers 20, as illustrated in the acompanying drawings, the feeding and delivery mechanisms at the lower part of the machine are arranged at the lower end of the bar 40. As indicated, these are of precisely the same construction as above described, but in the lower series of the fingers 20 there is no necessity for employing the contact lugs 23, these being merely necessary in the upper series in order to give the required movement to the slide 39 and the parts carried by and suspended therefrom.

For operating the machine power is taken from a countershaft 57, which latter is connected by a twisted belt 58 with the pulley 14, whereby the fan 15 is driven, and said shaft 57 is also connected by a belt 59 that passes over a pulley 60 carried by the shaft 37, whereby the latter is given rotation. A belt 61 connects the shaft 37 with the shaft 8, so that the worm 7 is driven from said shaft 37, movement of the shaft 3, however, being necessarily slow in order to impart slow rotation to the drum 6.

In order that the swinging abutment 24 may be released from engagement with the contact lugs 23, said abutment is provided with a contact arm 62, which contact arm is designed to be engaged by a releasing finger 63 carried by the slide 39. When the slide 39 is projected into the casing 1 the finger 63 engages the arm 62, swinging the abutment 24 on its pivot, and removing its lower end from engagement with the contiguous contact lug 23, whereupon the locking pawl 25 is retracted by the spring 27, and the end thereof projected into the path of the stud 28, in which position said locking pawl arrests rotation of the disk 29 until the locking pawl 25 is again released by the contact lug 23 of the next succeeding finger 20.

That the downward swinging movement of the abutment 24 may be limited, said abutment is provided with a stop 64 which engages a limiting tooth 65 at the under side of the locking pawl 25.

If desired, means for exhausting the saturated air from the casing 1 may be employed, and such means are illustrated conventionally in Fig. 3 as a fan 65 driven from the shaft 57. Any form, however, of exhauster may be provided for this purpose.

In the operation of the herein described machine the forms 18 bearing the wet stockings are placed upon the guide rails 45, and gravitate in regular succession thereon, the lowermost form coming to rest at a point opposite to the slot 21. As soon as the locking pawl 25 is released from the crank disk 29, in the manner previously described, said disk commences to rotate, and by the link 41 moves the slide 39 in the guide 38 in an inward direction. As the lowermost form in the guide rails 45 is resting against the stop 44, and therefore is in the path of movement of the pusher 43, the latter projects this particular form with its wet stocking through the slot 21, and between the two supporting fingers 20 that are opposite to said slot. With this inward movement of the slide 39 the releasing finger 63 is moved into contact with the arm 62 of the abutment 24, swinging the latter upon its pivot, and thus permitting the locking pawl 25 to be retracted by the spring 27 to the point where the pawl will be in the path of movement of the stud 28 carried by the disk 29, and when this stud engages the pawl the disk 29 again comes to rest. It is to be observed that the inward movement of the slide 39 occurs on the first half revolution of the disk 29, while the outward movement of the slide 39 takes place during the last half revolution of said disk. Simultaneously with the passage of the stop 44 and pusher 43 into the casing 1 for introducing the stocking to be dried, the supporting arm 48 and the delivery arm 49 are also projected through the outlet slot 22, entering in advance of the next dried stocking to be removed, the delivery arm 49 yielding, by reason of the spring 51, against the advancing movement of the form, and the engaging head 50 of the arm 49 taking against the inner edge of that particular form. As the slide 39 recedes, the form with the dried stocking that is now engaged by the delivery arm 49 passes out of the slot 22 and upon the delivery guide rails 52, the cleats of that form sliding upon the bar 53 and the pawl 54. As the releasing finger 63 leaves the abutment 24, the latter swings back to its normal position, or in the path of the next advancing contact lug 23, and as soon as engagement of the latter takes place, the locking pawl 25 moves with the contact lug, again releasing the stud 28, and permitting the crank disk 29 to make another revolution, whereat another wet stocking with its form is projected into the casing and upon the supporting fingers, and another dried stocking removed from the casing. At the time when the supporting arm 48 and delivery arm 49 are passed into the casing the beveled face 55 of the former, acting as a wedge, moves the forms of the dried stockings along the delivery guide rails 52, thus making a place thereon for the form of the dried stocking that is to be removed from the casing when said arms 48 and 49 are projected therefrom, so that the forms of the dried stockings, as they accumulate on the guide rails 52, are gradually displaced from the position in which they are delivered, and moved along said rails. The drum 6 continuously rotates, and during its rotation the fan 15 is also being operated to project the air downwardly over the coils 9, and out of the drum 6 through the openings 16 into the space between said drum and the casing 1, in which space the air rises to the top of the casing, and is again drawn into the drum by the fan 15. It will, of course, be understood that provision may be made for exhausting the air from the casing 1 when the air becomes saturated with moisture, for which purpose any suitable means may be employed. As the air under the blast of the fan is forced out through the openings 16, the air is brought into contact with the heel portions of the stockings, thus insuring drying of the same. The feed guide rails 45 are filled from time to time with the forms carrying the moist stockings, and likewise the delivery guide rails 52 freed from their accumulation of the forms carrying the dried stockings, so that after the machine has been set in operation it is only necessary to maintain a proper supply of moist stockings on the feed guide rails, the inclination of the latter causing the forms to gravitate to the inlet slot 21, there to be introduced to the interior of the casing 1 by the feeding mechanism described.

From the foregoing description it will be seen that the present invention provides a machine which is designed for continuous operation; one which materially increases the speed and capacity of machines commonly employed for this purpose, and at the same time provides a machine that is more compact in the association of its parts so that the same is adaptable to less floor space. Furthermore, by suspending the forms 18 through the medium of the cleats 19, the stockings, during their transit through the machine, have no contact with any of the parts thereof. This precludes marking of the stockings which commonly occurs in the machines now usually employed in view of the necessity of resting the moist stockings upon the various supporting elements of the machine.

Having thus described the invention, what is claimed as new, and desired to be secured by Letters Patent, is:—

1. In a machine of the class described, a casing, means within the casing for supporting the articles to be dried, means for feeding the articles to said supporting means, means for removing the articles from said supporting means after they have been dried, and means controlled by said supporting means for actuating the feeding and removing means.

2. In a machine of the class described, a casing, means within the casing for supporting the articles to be dried, means associated with said casing and movable relatively thereto for feeding the articles to said supporting means and for removing the articles from said supporting means after they have been dried, and means controlled by said supporting means for actuating the feeding and removing means.

3. In a machine of the class described, a casing, a rotatable carrier within the casing, supports associated with said carrier upon which the articles to be dried are sustained, means for feeding the articles to said supports, and means for removing the articles from said supports after they have been dried, and means controlled by said carrier for actuating the feeding and removing means.

4. In a machine of the class described, a casing, a rotatable carrier within the casing, supports associated with said carrier and upon which the articles to be dried are sustained, means associated with said casing and movable relatively thereto for feeding the articles to said supports and for removing the articles from said supports after they have been dried, and means controlled by said carrier for actuating the feeding and removing means.

5. In a machine of the class described, a casing, a continuously-operating carrier within the casing having means for sustaining the articles to be dried, means for feeding the articles to said carrier, means for removing the articles from said carrier after they have been dried, and means controlled by said carrier for actuating the feeding and removing means.

6. In a machine of the class described, a casing, a continuously-operating carrier within the casing having means for sustaining the articles to be dried, means associated with said casing and movable relatively thereto for feeding the articles to said carrier and for removing the articles from said carrier after they have been dried, and means controlled by said carrier for actuating the feeding and removing means.

7. In a machine of the class described, a casing, a continuously-operating carrier within the casing having means for sustaining the articles to be dried, intermittently-operating means for feeding the articles to the carrier and for removing the articles from the carrier after they have been dried, and means controlled by said carrier for actuating the feeding and removing means.

8. In a machine of the class described, a casing, means within the casing for supporting the articles to be dried, means movable into and out of said casing for feeding to said supporting means the articles to be dried and removing the articles from said supporting means after they have been dried, and means controlled by said supporting means for actuating the feeding and removing means.

9. In a machine of the class described, a casing provided with inlet and outlet openings, means within the casing for supporting the articles to be dried, a reciprocatory device associated with the inlet opening for feeding the articles to said supporting means, a reciprocatory device also associated with the outlet opening for removing the dried articles from the casing, and means for actuating said reciprocatory devices.

10. In a machine of the class described, a casing provided with inlet and outlet openings, a continuously-operating carrier within the casing having means for sustaining the articles to be dried, a reciprocatory device associated with the inlet opening for feeding the articles to said sustaining means, a reciprocatory device also associated with the outlet opening for removing the dried articles from the casing, and means for actuating said reciprocatory devices.

11. In a machine of the class described, a casing, a continuously-operating carrier within the casing having means for sustaining the articles to be dried, means movable into and out of said casing for feeding the articles to the carrier and removing the same from the carrier after the articles have been dried, means for imparting to said feeding and removing means an intermittent motion, and connections between the last-mentioned means and said carrier for controlling movement thereof by said carrier.

12. In a machine of the class described, a casing, a continuously-operating carrier within the casing having means for sustaining the articles to be dried, and feeding and delivery mechanism associated with said casing and movable simultaneously into and out of said casing.

13. In a machine of the class described, a casing, a carrier within the casing having means for sustaining the articles to be dried, feeding and delivery mechanism associated with said casing, means for actuating said feeding and delivery mechanism, and means controlled by said carrier for effecting operation of said feeding and delivery mechanism.

14. In a machine of the class described, a casing, a continuously-operating carrier within the casing having means for sustaining the articles to be dried, feeding and delivery mechanism associated with said casing, means for actuating said feeding and delivery mechanism, and means controlled by said carrier for imparting to said feeding and delivery mechanism intermittent movement.

15. In a machine of the class described, a casing, a continuously-operating carrier within the casing having means for sustaining the articles to be dried, feeding and delivery mechanism associated with said casing and movable simultaneously into and out of said casing, means for actuating the feeding and delivery mechanism, and means controlled by said carrier for imparting intermittent movement to said feeding and delivery mechanism.

16. In a machine of the class described, a casing, a rotatable carrier mounted therein, radial fingers associated with said carrier and providing supports for the articles to be dried, whereby said articles are sustained free from contact with the carrier, and means for feeding the articles to said fingers and removing the same therefrom.

17. In a machine of the class described, a casing, a rotatable carrier arranged therein, radial fingers associated with said carrier and spaced apart, whereby to receive supports for the articles to be dried and to sustain the supports in position with the articles free from contact with the carrier, and means for feeding the articles to said fingers and removing the same therefrom.

In testimony whereof I affix my signature, in the presence of two witnesses.

BERTRAND A. PARKES.

Witnesses:
E. L. SMITH,
THOMAS ALLSOP.